(12) United States Patent
Murakami et al.

(10) Patent No.: US 11,433,766 B2
(45) Date of Patent: Sep. 6, 2022

(54) DRIVING DEVICE OF ELECTRIC-MOTOR FOUR-WHEEL DRIVE VEHICLE

(71) Applicant: SUBARU CORPORATION, Tokyo (JP)

(72) Inventors: Mamoru Murakami, Tokyo (JP); Naohiro Imamura, Tokyo (JP); Takahito Inoh, Tokyo (JP); Koki Mitsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 239 days.

(21) Appl. No.: 16/922,068

(22) Filed: Jul. 7, 2020

(65) Prior Publication Data

US 2021/0031622 A1 Feb. 4, 2021

(30) Foreign Application Priority Data

Jul. 31, 2019 (JP) .............................. JP2019-140615

(51) Int. Cl.
*B60K 17/354* (2006.01)
*B60K 1/02* (2006.01)
(Continued)

(52) U.S. Cl.
CPC .............. *B60K 17/354* (2013.01); *B60K 1/02* (2013.01); *B60K 17/165* (2013.01); *B60L 50/60* (2019.02); *B60L 2220/50* (2013.01)

(58) Field of Classification Search
CPC ...... B60K 17/354; B60K 1/02; B60K 17/165; B60K 2001/001; B60K 17/35; B60K 1/00;
(Continued)

(56) References Cited

U.S. PATENT DOCUMENTS 10,377,221 B2 * 8/2019 Holmes .................. B60K 6/445
2009/0321153 A1 * 12/2009 Boeckenhoff ............ B60K 6/52
180/24.1

(Continued)

FOREIGN PATENT DOCUMENTS

CN 205989655 U * 3/2017
JP 2014-87251 A 5/2014
(Continued)

*Primary Examiner* — Justin Holmes
(74) *Attorney, Agent, or Firm* — Troutman Pepper Hamilton Sanders LLP

(57) ABSTRACT

A driving device of an electric-motor four-wheel drive vehicle includes a propeller shaft, a first differential mechanism, a second differential mechanism, a first decoupling mechanism, a second decoupling mechanism, a first motor, and a second motor. The propeller shaft transmits power between front wheels and rear wheels. The first differential mechanism is disposed in a drive shaft of the front wheels. The second differential mechanism is disposed in a drive shaft of the rear wheels. The first decoupling mechanism decouples the first differential mechanism from the propeller shaft. The second decoupling mechanism decouples the second differential mechanism from the propeller shaft. The first motor is coupled to the propeller shaft via a part closer to the front wheels than the first decoupling mechanism or a part closer to the rear wheels than the second decoupling mechanism. The second motor is coupled between the first and second decoupling mechanisms.

19 Claims, 7 Drawing Sheets

(51) Int. Cl.
*B60K 17/16* (2006.01)
*B60L 50/60* (2019.01)

(58) Field of Classification Search
CPC ... B60K 17/346; B60L 50/60; B60L 2220/50;
B60L 15/2054; B60L 2220/42; B60L
2260/28; Y02T 10/64; Y02T 10/72
See application file for complete search history.

(56) References Cited

U.S. PATENT DOCUMENTS

| | | |
|---|---|---|
| 2014/0121870 A1 | 5/2014 | Lee |
| 2021/0155219 A1* | 5/2021 | Alcantar ............... B60K 17/02 |

FOREIGN PATENT DOCUMENTS

| | | |
|---|---|---|
| JP | 2016-92995 A | 5/2016 |
| JP | 2018-17354 A | 2/2018 |
| JP | 2018-70076 A | 5/2018 |

* cited by examiner

FIG. 2

|  | FIRST STATE | SECOND STATE | THIRD STATE | FOURTH STATE |
|---|---|---|---|---|
| FIRST MOTOR | OFF | ON | ON | ON |
| SECOND MOTOR | ON | OFF | ON | ON |
| FIRST DECOUPLING MECHANISM | COUPLING IS MAINTAINED | DECOUPLED | COUPLING IS MAINTAINED | DECOUPLED |
| SECOND DECOUPLING MECHANISM | COUPLING IS MAINTAINED | DECOUPLED | COUPLING IS MAINTAINED | COUPLING IS MAINTAINED |

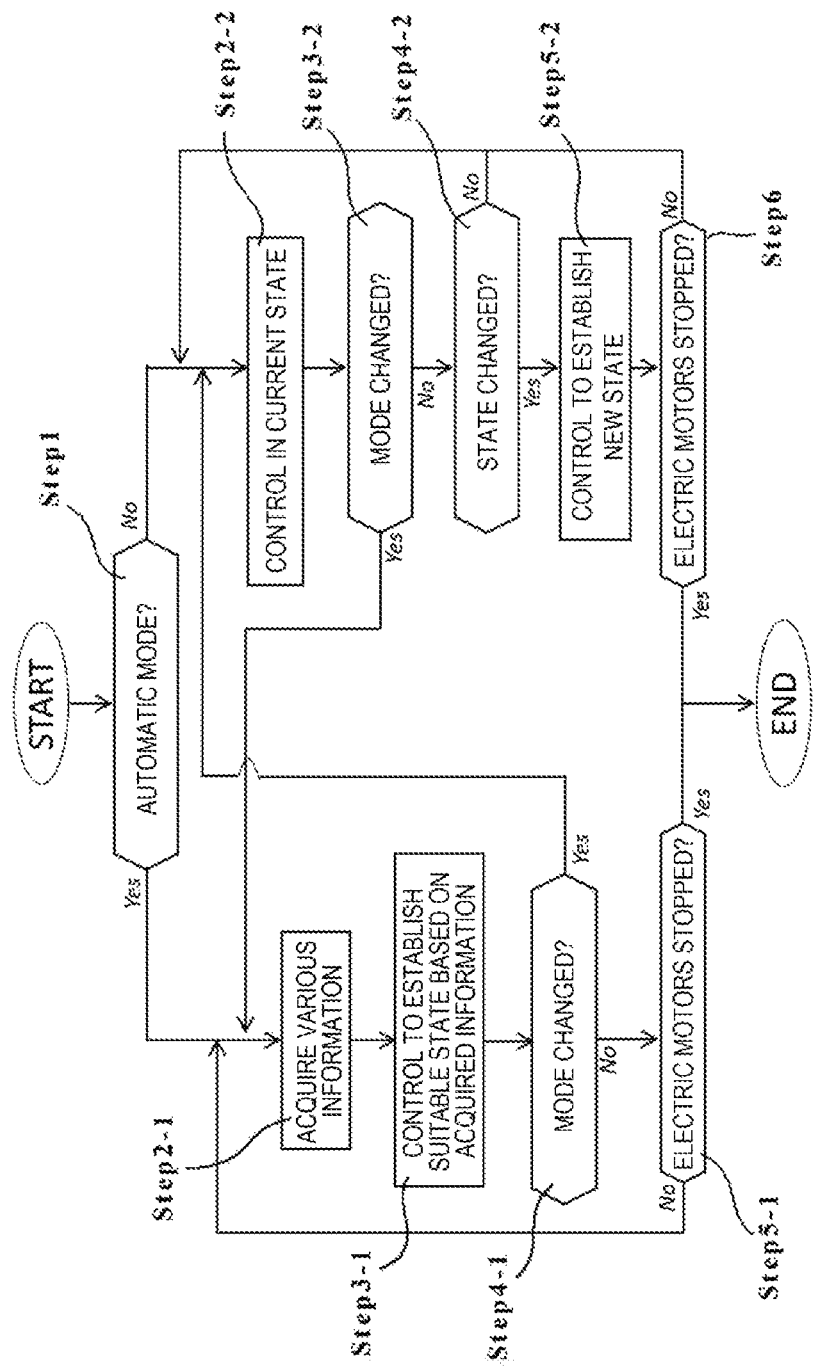

DRIVING DEVICE OF ELECTRIC-MOTOR FOUR-WHEEL DRIVE VEHICLE

CROSS-REFERENCE TO RELATED APPLICATIONS

The present application claims priority from Japanese Patent Application No. 2019-140615 filed on Jul. 31, 2019, the entire contents of which are hereby incorporated by reference.

BACKGROUND

The disclosure relates to a drive system technique of an electric vehicle that is driven by an electric motor. More specifically, the disclosure relates to a driving device of an electric-motor four-wheel drive vehicle with front and rear wheels that are driven by multiple electric motors.

From the point of view of energy saving and depletion of fossil fuel resources, such as petroleum resources, in recent years, electric vehicles that are driven by electric motors have been receiving attention again. Among these electric vehicles, for example, two-wheel drive electric vehicles using front wheels or rear wheels as drive wheels, and four-wheel drive electric vehicles using four wheels as drive wheels, are publicly known.

The four-wheel drive electric vehicles are roughly classified into two types: an electric vehicle with an electric motor at a wheel, and an electric vehicle with an electric motor in which the power is transmitted to each drive wheel via a power transmission mechanism.

In one example, an in-wheel motor electric vehicle with an electric motor at each of four wheels is disclosed in, for example, Japanese Unexamined Patent Application Publication (JP-A) No. 2016-92995. In another example, a twin-motor electric vehicle with two electric motors for respectively driving front wheels and rear wheels is disclosed in, for example, JP-A No. 2018-70076. In still another example, a combination electric vehicle with one electric motor for driving front wheels or rear wheels and with an in-wheel motor at the other wheel disclosed in, for example, JP-A No. 2014-87251.

SUMMARY

An aspect of the present disclosure provides a driving device of an electric-motor four-wheel drive vehicle. The device includes a propeller shaft, a first differential mechanism, a second differential mechanism, a first decoupling mechanism, a second decoupling mechanism, a first motor, and a second motor. The propeller shaft is configured to transmit power between front wheels and rear wheels. The first differential mechanism is to be disposed in a drive shaft of the front wheels. The second differential mechanism is to be disposed in a drive shaft of the rear wheels. The first decoupling mechanism is configured to decouple the first differential mechanism from the propeller shaft. The second decoupling mechanism is configured to decouple the second differential mechanism from the propeller shaft. The first motor is coupled to the propeller shaft via one of (i) a part closer to the front wheels than the first decoupling mechanism and (ii) a part closer to the rear wheels than the second decoupling mechanism. The second motor is coupled between the first decoupling mechanism and the second decoupling mechanism.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a state comparative diagram illustrating states of each of electric motors and each of decoupling mechanisms that are controlled by a controller.

FIG. 7 is a flowchart illustrating a driving control method of the electric-motor four-wheel drive vehicle according to the embodiment.

DETAILED DESCRIPTION

Figure 1:
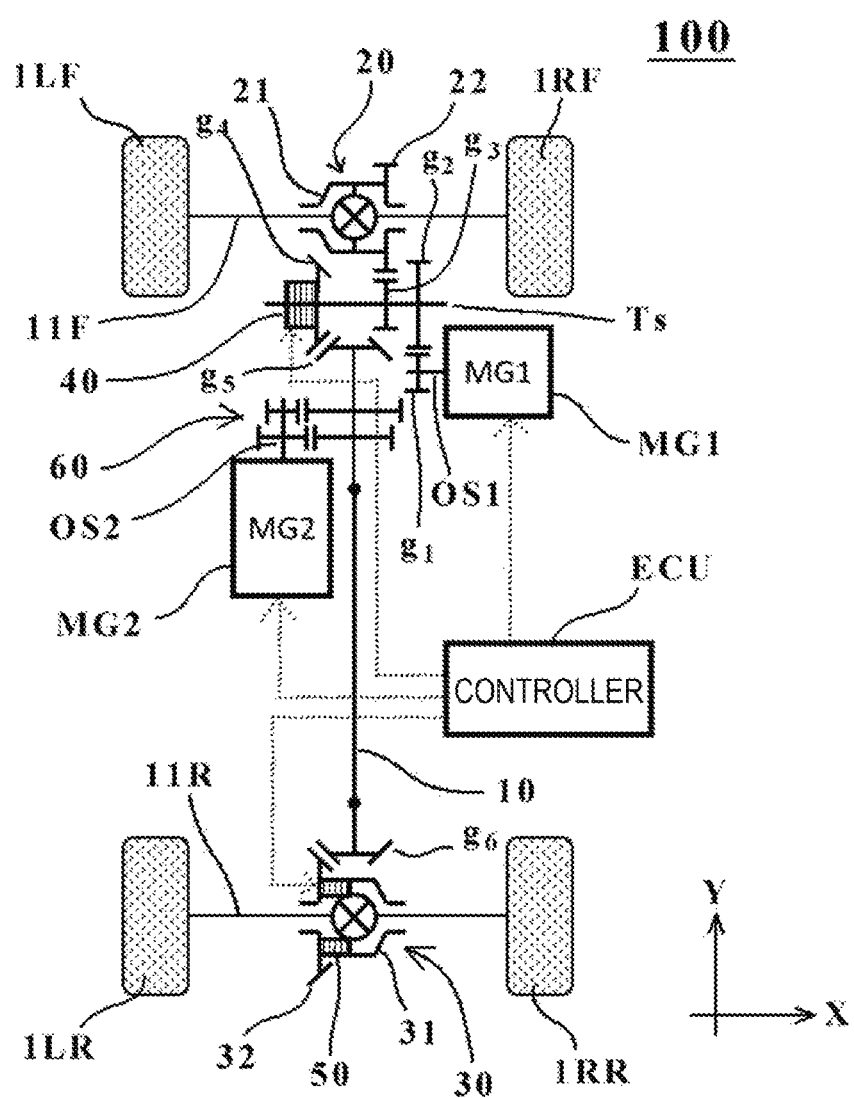
FIG. 1 is a block diagram illustrating a driving force transmission system of an electric-motor four-wheel drive vehicle according to an embodiment.

Current techniques as well as the above-described Patent Literatures do not appear to appropriately satisfy market needs, and each of the above-described methods has the following problems.

Basically, each driving method that is exemplified in, for example, the above-described Patent Literatures, is employed in a configuration without a propeller shaft as a mechanical structural component. Not mounting a propeller shaft provides a good effect on reduction in weight, but makes it difficult to achieve performance that can be obtained by a four-wheel drive vehicle with an established internal combustion engine of a related art.

In more detail, for example, when either one of right and left drive wheels slips on a road in a poor state, such as a rough road, it is structurally difficult to redistribute a driving force generated by the electric motor, to the other drive wheel, which does not slip. Moreover, in order to cope with the slip state by simply using the other drive wheel, which does not slip, the torque capacity of the onboard electric motor may be increased. This can cause great increase in cost and volume and appears to be not practical.

Thus, existing techniques have a great difficulty in achieving performance equivalent to the performance of a four-wheel drive vehicle with an internal combustion engine. In view of this, there is still a probability of further improvement in efficiency of transmission of a driving force of an electric motor.

The disclosure has been achieved in view of the problems that are described above as examples, and it is desirable to provide a driving device of an electric-motor four-wheel drive vehicle having a propeller shaft for efficiently transmitting a driving force of an electric motor.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, for convenience, a vehicle height direction of an electric-motor four-wheel drive vehicle 100 is defined as Z direction, a vehicle longitudinal direction of the vehicle 100 is defined as Y direction, and a vehicle width direction of the vehicle 100 perpendicular to the Z direction and the Y direction is defined as X direction. Needless to say, however, this definition of the directions is not to affect the embodiments of the disclosure and is not to unduly narrow the scope of the appended claims. The rest of configurations detailed below may be suitably complemented by known techniques including those disclosed in the above-described Patent Literatures.

Electric-Motor Four-Wheel Drive Vehicle 100

First, a configuration of the electric-motor four-wheel drive vehicle 100 according to an embodiment of the disclosure will be described with reference to FIG. 1.

As illustrated in the drawing, the electric-motor four-wheel drive vehicle 100 of this embodiment is an electric vehicle with drive wheels 1 that are driven by electric motors. The electric-motor four-wheel drive vehicle 100 includes a propeller shaft 10, a first differential mechanism 20, a second differential mechanism 30, a first decoupling mechanism 40, a second decoupling mechanism 50, a first motor MG1, a second motor MG2, and a controller ECU.

The drive wheels 1 of this embodiment include a right front wheel 1RF and a left front wheel 1LF that constitute front wheels, and a right rear wheel 1RR and a left rear wheel 1LR that constitute rear wheels. As illustrated in FIG. 1, the right front wheel 1RF and the left front wheel 1LF are coupled to each other via a drive shaft 11F of the front wheels and the first differential mechanism 20. The first differential mechanism 20 functions as a differential mechanism. The right rear wheel 1RR and the left rear wheel 1LR are coupled to each other via a drive shaft 11R of the rear wheels and the second differential mechanism 30. The second differential mechanism 30 functions as a differential mechanism.

The propeller shaft 10 transmits a driving force or rotation between the front wheel side and the rear wheel side. For example, the propeller shaft 10 is provided with a drive pinion as a fifth gear g5 at an end part on the front wheel side. The fifth gear g5 is engageable with a fourth gear g4 that interlocks with the first decoupling mechanism 40, which will be described later. On the other hand, the propeller shaft 10 is also provided with a drive pinion as a sixth gear g6 at an end part on the rear wheel side. The sixth gear g6 is engageable with a rear drive pinion 32 that interlocks with the second decoupling mechanism 50, which will be described later.

The first differential mechanism 20 is provided in the drive shaft 11 of the front wheels in this embodiment. The first differential mechanism 20 functions as the differential mechanism to make the right front wheel 1RF and the left front wheel 1LF have different revolution speeds in, for example, turning the vehicle. For example, the first differential mechanism 20 includes a ring gear 22 and a differential case 21. The ring gear 22 engages with a third gear g3, which will be described later. The differential case 21 is co-rotatably joined to the ring gear 22. In the differential case 21, side gears (not illustrated in the drawing) are disposed on the right and left, and two pinion gears (not illustrated in the drawing) are disposed so as to respectively engage with the side gears on the right and left, in a manner similar to the structure of other publicly known differential gear. The side gear on the right is coupled to the drive shaft 11F on the right front wheel 1RF side. The side gear on the left is coupled to the drive shaft 11F on the left front wheel 1LF side.

The second differential mechanism 30 is provided in the drive shaft 11R of the rear wheels in this embodiment. As in the case of the first differential mechanism 20, the second differential mechanism 30 is configured to make the right rear wheel 1RR and the left rear wheel 1LR have different revolution speeds in, for example, turning the vehicle. For example, the second differential mechanism 30 includes the orthogonal gear 32 and a differential case 31. The orthogonal gear 32 engages with the sixth gear g6. The differential case 31 is co-rotatably joined to the orthogonal gear 32. The differential case 31 is provided with side gears and pinion gears (not illustrated in the drawing), as described above. The differential case 31 is also provided with the second decoupling mechanism 50, which will be described later.

The first decoupling mechanism 40 decouples the first differential mechanism 20 from the propeller shaft 10. For example, the first decoupling mechanism 40 of this embodiment generates two states under control of the controller ECU, which will be described later. One of the two states is a maintained state in which the first differential mechanism 20 and the propeller shaft 10 are coupled to each other, whereby a driving force is able to be transmitted. The other is a decoupled state in which the first differential mechanism 20 and the propeller shaft 10 are decoupled from each other, whereby the driving force is not transmitted. Examples of a structure of such a first decoupling mechanism 40 may include a publicly known clutch mechanism, such as a dog clutch, and a decoupling mechanism as exemplified in JP-A No. 2018-17354.

The second decoupling mechanism 50 decoupled the second differential mechanism 30 from the propeller shaft 10. For example, the second decoupling mechanism 50 of this embodiment generates two states under control of the controller ECU, which will be described later. One of the two states is a maintained state in which the second differential mechanism 30 and the propeller shaft 10 are coupled to each other, whereby a driving force is able to be transmitted. The other is a decoupled state in which the second differential mechanism 30 and the propeller shaft 10 are decoupled from each other, whereby the driving force is not transmitted. As a specific structure of such a second decoupling mechanism 50, a structure similar to that of the first decoupling mechanism 40 may be used.

The first motor MG1 is coupled to the propeller shaft 10 via one of (i) a part closer to the front wheels than the first decoupling mechanism 40 and (ii) a part closer to the rear wheels than the second decoupling mechanism 50. In other words, the first motor MG1 may be disposed on the front wheel side or the rear wheel side of the propeller shaft 10. In this embodiment, as illustrated in FIG. 1, the first motor MG1 is coupled to a part closer to the front wheels than the first decoupling mechanism 40. Thus, a driving force from the first motor MG1 is transmitted to the drive shaft 11F of the front wheels and the fifth gear g5 of the propeller shaft 10 via the first decoupling mechanism 40.

As a specific example of such a first motor MG1, publicly known synchronous motor that is controlled via, for example, an inverter, which is not illustrated in the drawing, may be used.

Additionally, in this embodiment, it can be clearly known from FIG. 1 that an output shaft OS1 of the first motor MG1 may be disposed in parallel to the drive shaft 11F of the front wheels. This arrangement of the motor is also called "horizontal arrangement". This enables efficient transmission of the driving force generated by the first motor MG1 by using a spur gear instead of an orthogonal gear. In this example, the driving force is efficiently transmitted to the drive shaft 11F of the front wheels.

Moreover, not interposing an orthogonal gear between the first motor MG1 and the propeller shaft 10 prevents reduction in efficiency of transmission from the drive wheel to the first motor MG1, in regenerative charging of a battery, which is not illustrated in the drawing. Thus, in this embodiment, regenerative charging is performed by using the first motor MG1, which is mechanically coupled to the front wheel side of the propeller shaft 10, instead of the second motor MG2, which is mechanically coupled to the propeller shaft 10. This enables regenerative charging of the battery, with higher efficiency.

The second motor MG2 is coupled between the first decoupling mechanism 40 and the second decoupling mechanism 50. For example, the second motor MG2 is coupled to the propeller shaft 10 between the first decoupling mechanism 40 and the second decoupling mechanism 50, via a publicly known decelerator 60. Although the second motor MG2 of this embodiment is coupled to the propeller shaft 10 via the decelerator 60, the component is not limited to the decelerator 60. The second motor MG2 may be coupled via a publicly known speed change gear, instead of the decelerator 60.

Additionally, in this embodiment, an output shaft OS2 of the second motor MG2 may be disposed in parallel to the propeller shaft 10, as illustrated in FIG. 1. Namely, in some examples of this embodiment, the output shaft OS1 of the first motor MG1 and the output shaft OS2 of the second motor MG2 are disposed to be perpendicular to each other. This arrangement enables also the second motor MG2 to transmit the driving force to the propeller shaft 10 without an orthogonal gear that is interposed between the second motor MG2 and the propeller shaft 10.

In some examples, the maximum output or rated output of the second motor MG2 is greater than the maximum output or rated output of the first motor MG1. This enables more appropriate distribution of torque in accordance with a travel state, in torque distribution control performed by the controller ECU, which will be described later.

Details of Configuration of Driving Force Transmission System

As illustrated in FIG. 1, in this embodiment, a first gear g1 including a spur gear is provided in the output shaft OS1 of the first motor MG1. In addition, a middle shaft Ts is disposed between the output shaft OS1 of the first motor MG1 and the drive shaft 11F of the front wheels. The middle shaft Ts transmits the driving force from the first motor MG1 and a regenerative force from the drive wheel.

In this embodiment, the middle shaft Ts is disposed so as to be parallel to the output shaft OS1 of the first motor MG1 and to the drive shaft 11F of the front wheels. The middle shaft Ts is joined to each of a second gear g2, the third gear g3, the fourth gear g4, and the first decoupling mechanism 40. The second gear g2 engages with the first gear g1. The third gear g3 engages with the ring gear 22. The fourth gear g4 includes an orthogonal gear.

This configuration causes, for example, the driving force generated by the first motor MG1, to be transmitted to the first gear g1, the second gear g2, the third gear g3, and the ring gear 22, in this order, and reach the drive wheel of the drive shaft 11F of the front wheels. In the case in which the first decoupling mechanism 40 is in the maintained state, the driving force generated by the first motor MG1 is transmitted to the first gear g1, the second gear g2, and the fourth gear g4, in this order, and reaches, the fifth gear g5 of the propeller shaft 10. Namely, rotation of the first motor MG1 can be at least partially transmitted to the propeller shaft 10 and the drive shaft 11R of the rear wheels via the first decoupling mechanism 40.

Torque Distribution Control Performed by Controller ECU

Next, torque distribution control performed by the controller ECU in this embodiment will be detailed with reference to FIG. 2.

The controller ECU of this embodiment is primarily implemented by a publicly known microcomputer. The controller ECU controls the first motor MG1 and the second motor MG2 via inverters, which are not illustrated in the drawing. The controller ECU includes components such as a publicly known vehicle dynamics control (VDC) unit that controls the vehicle behavior. Various control units mutually exchange control information and control parameter information via an in-vehicle network implemented by a communication bus, for example, CAN, to execute motor driving force control, vehicle behavior control, and other control. The control information includes various calculated values. The control parameter information is measured by various sensors, such as a vehicle speed sensor.

Moreover, the controller ECU controls the driving force transmission system to execute appropriate torque distribution relative to the front and rear drive wheels. For example, the controller ECU of this embodiment controls decoupling of each of the first decoupling mechanism 40 and the second decoupling mechanism 50.

An example of the torque distribution control for the front and rear wheels, which is performed by such a controller ECU, is illustrated in FIG. 2.

As illustrated in the drawing, the controller ECU controls decoupling of each of the first decoupling mechanism 40 and the second decoupling mechanism 50 in accordance with output states of the first motor MG1 and the second motor MG2.

Nonlimiting examples of the torque distribution control in specific travel conditions or specific travel states will be described with reference to FIGS. 3 to 6, hereinafter.

First State

Figure 3:
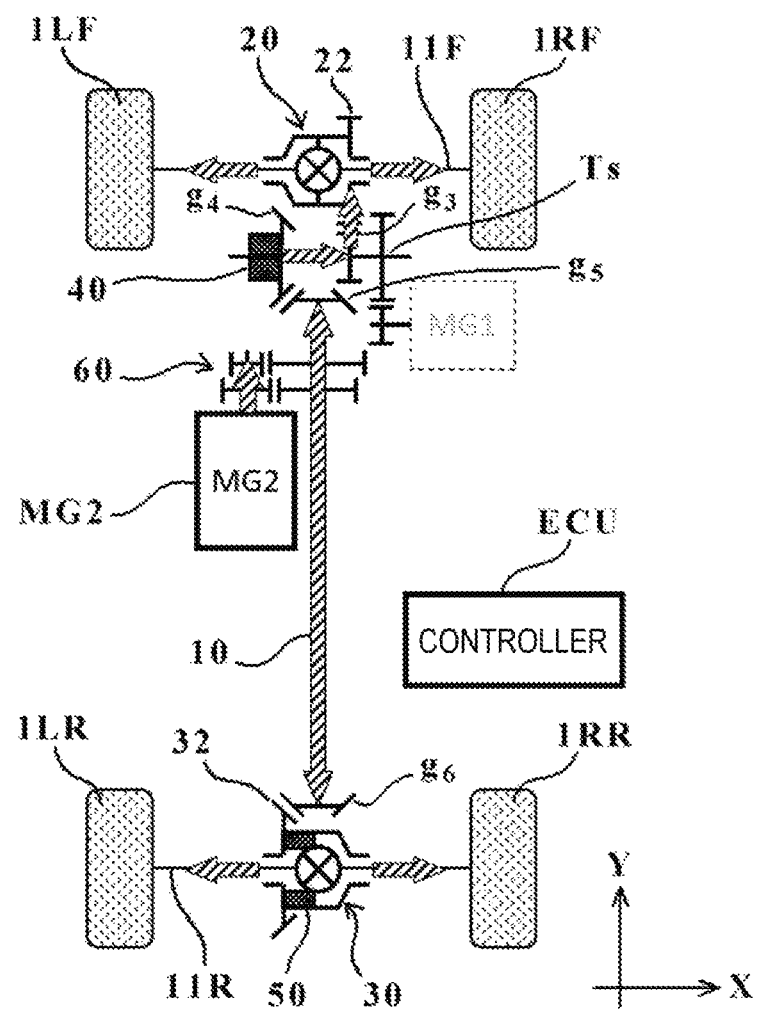
FIG. 3 is a schematic diagram schematically illustrating that a driving force of an electric motor is transmitted to drive wheels in a first state.

Examples of the first state illustrated in FIG. 2 include a start state in which the electric-motor four-wheel drive vehicle 100 starts and a state of traveling on a low μ road. The transmission state of the driving forces from the electric motors and the torque distribution state in the first state are illustrated in FIG. 3.

It can be clearly known from these drawings that the controller ECU controls the first decoupling mechanism 40 and the second decoupling mechanism 50 in such a manner as to maintain the coupling between the first differential mechanism 20 and the propeller shaft 10 and to maintain the coupling between the second (differential mechanism 30 and the propeller shaft 10. At the same time, the controller ECU controls to stop driving the first motor MG1 and controls to transmit the driving force from the second motor MG2 to the propeller shaft 10 via an inverter, which is not illustrated in the drawing.

Thus, no output is provided from the first motor MG1, but output from the second motor MG2 is transmitted to each of the drive shaft 11F of the front wheels and the drive shaft 11R of the rear wheels via the propeller shaft 10.

Herein, this embodiment, assumes, for example, a start state in which large torque is used, or a state of traveling on a slipping road surface due to a cause such as accumulation of snow, icing, or rain, as the first state. In such a state, the maintained states are established while the second motor MG2 that provides greater output than the first motor MG1 is used. This enables stable transmission of the driving force from the high output second motor MG2 to all of the drive wheels via the propeller shaft 10.

Second State

Figure 4:
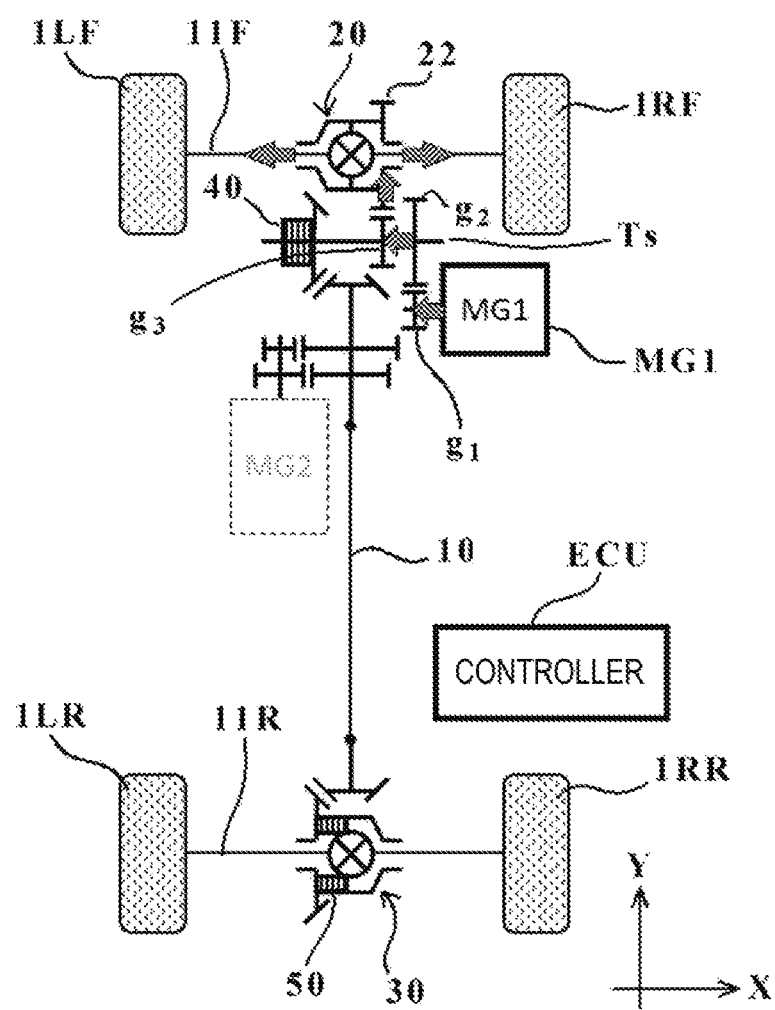
FIG. 4 is a schematic diagram schematically illustrating that a driving force of an electric motor is transmitted to the drive wheels in a second state.

Examples of the second state illustrated in FIG. 2 include a state in which the electric-motor four-wheel drive vehicle 100 travels at an approximately constant speed, and a normal travel state in which the traveling road condition is not poor and high torque is not used. The transmission state of the driving forces from the electric motors and the torque distribution state in the second state are illustrated in FIG. 4.

It can be clearly known from these drawings that the controller ECU controls the first decoupling mechanism 40 and the second decoupling mechanism 50 in such a manner as to decouple the first differential mechanism 20 from the propeller shaft 10 and to decouple the second differential mechanism 30 from the propeller shaft 10. At the same time, the controller ECU controls to stop driving the second motor MG2 and controls to transmit the driving force from the first motor MG1 to the middle shaft Ts via an inverter, which is not illustrated in the drawing.

Thus, no output is provided from the second motor MG2, but output from the first motor is transmitted to the drive shaft 11F of the front wheels.

As described above, high torque is not used in the second state. In view of this, two-wheel drive structure is established while saving energy is mainly considered. As a result, the driving force or the torque is distributed from the first motor MG1, which provides lower output than the second motor MG2, simply to the front wheels. The torque is distributed from the first motor MG1 simply to the front wheels in this embodiment, but the structure is not limited to this. For example, the first motor MG1 may be disposed on the rear wheel side, and the driving force or the torque may be distributed simply to the rear wheels.

The second decoupling mechanism 50 is controlled to decouple the second differential mechanism 30 from the propeller shaft 10. However, on the condition that output from the second motor MG2 is stopped while the first differential mechanism 20 is decoupled from the propeller shaft 10, the coupling between the second differential mechanism 30 and the propeller shaft 10 may be maintained.

Third State

Figure 5:
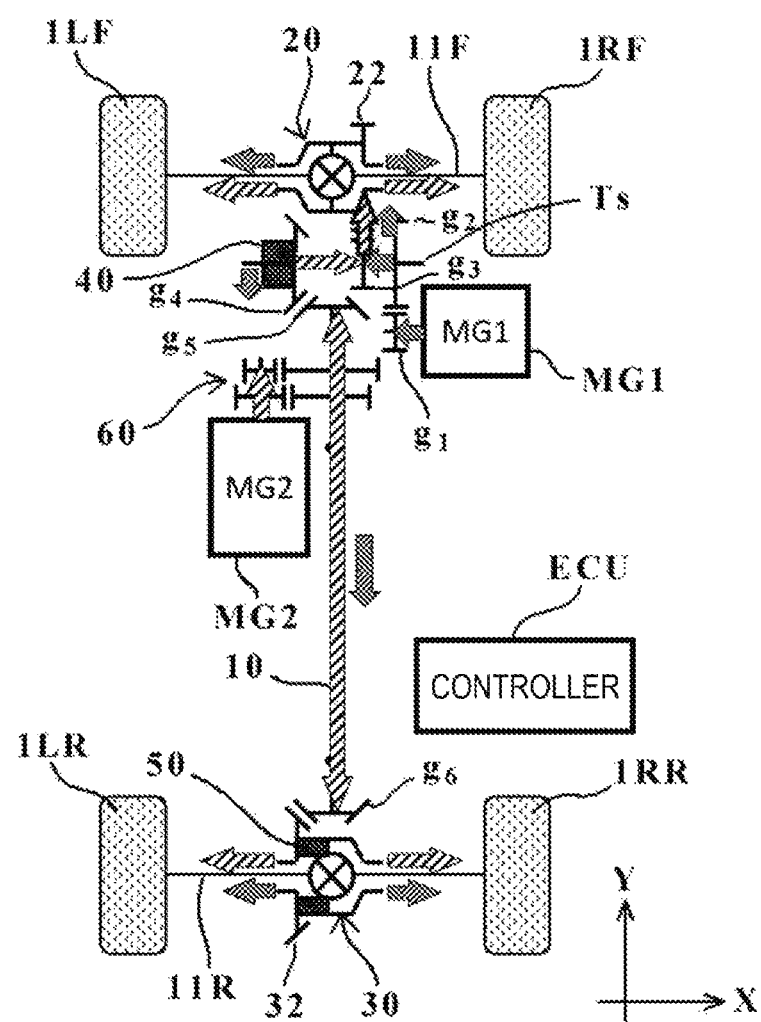
FIG. 5 is a schematic diagram schematically illustrating that the driving forces of the electric motors are transmitted to the drive wheels in a third state.

Examples of the third state illustrated in FIG. 2 include a state of travelling on a road having poor road surface conditions, such as a rough road, and a hill-climbing state in which high torque is used. The transmission state of the driving forces from the electric motors and the torque distribution state in the third state are illustrated in FIG. 5.

It can be clearly known from these drawings that the controller ECU controls the first decoupling mechanism 40 and the second decoupling mechanism 50 in such a manner as to maintain the coupling between the first differential mechanism 20 and the propeller shaft 10 and to maintain the coupling between the second differential mechanism 30 and the propeller shaft 10. At the same time, the controller ECU controls to transmit the driving forces from both of the first motor MG1 and the second motor MG2 to each of the middle shaft Ts and the propeller shaft 10 via inverters, which are not illustrated in the drawing.

Thus, output from the first motor MG1 and output from the second motor MG2 are transmitted to the drive shaft 11F of the front wheels and the drive shaft 11R of the rear wheels via the propeller shaft 10 and the middle shaft Ts.

As described above, high torque is used in the third state. In view of this, the structure is established mainly in order to provide high power, and the first motor MG1 and the second motor MG2 are fully driven so that maximum driving forces will be distributed to all of the front and rear drive wheels. This structure enables achieving excellent road running performance, which is particularly suitable, for example, for an SUV, by using the two electric motors and the propeller shaft 10.

Fourth State

Figure 6:
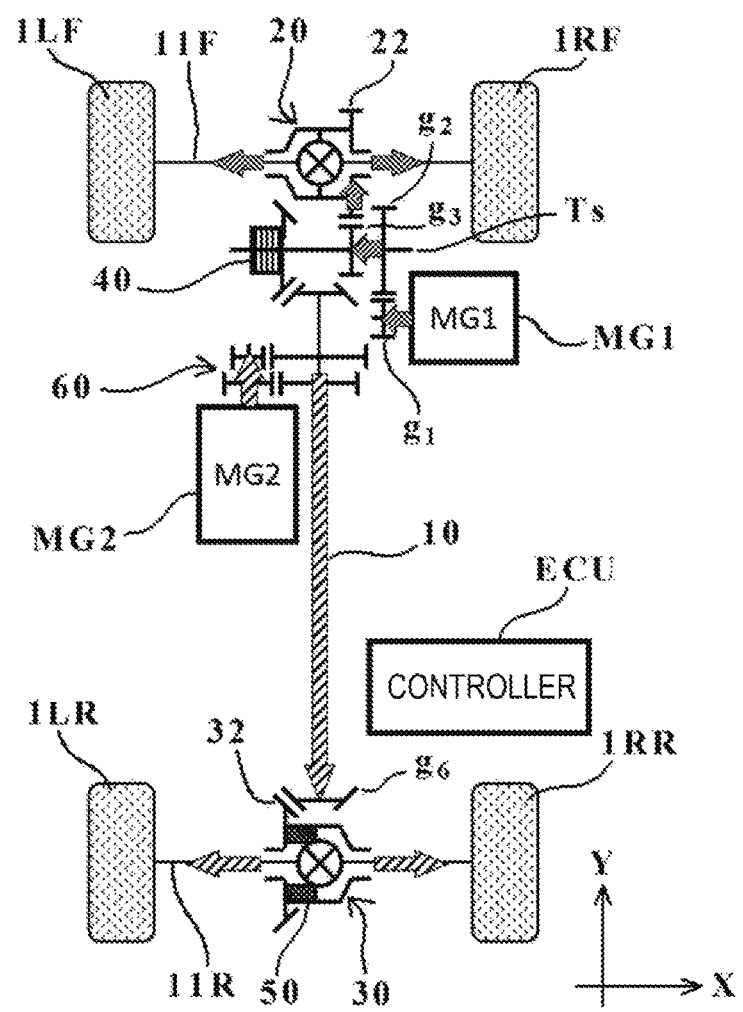
FIG. 6 is a schematic diagram schematically illustrating that the driving forces of the electric motors are transmitted to the drive wheels in a fourth state.

Examples of the fourth state illustrated in FIG. 2 include includes a sporty traveling state in which a steering wheel is quickly and finely operated. The transmission state of the driving forces from the electric motors and the torque distribution state in the fourth state are illustrated in FIG. 6.

It can be clearly known from these drawings that the controller ECU controls the first decoupling mechanism 40 and the second decoupling mechanism 50 in such a manner as to decouple the first differential mechanism 20 from the propeller shaft 10 but to maintain the coupling between the second differential mechanism 30 and the propeller shaft 10. At the same time, the controller ECU controls to transmit the driving forces from both of the first motor MG1 and the second motor MG2 to each of the middle shaft is and the propeller shaft 10 via inverters, which are not illustrated in the drawing.

Thus, output from the first motor MG1 is transmitted to the drive shaft 11F of the front wheels, and output from the second motor MG2 is transmitted to the drive shaft 11R of the rear wheels.

As described above, the fourth state occurs when the vehicle travels on, for example, a circuit, and may need high movement performance as well as high torque. In view of this, the structure is established in such a manner that the first motor MG1 and the second motor MG2 are respectively assigned to the front wheels and the rear wheels, whereby the driving forces are mutually independently distributed. This structure enables implementing torque vectoring on the front and rear wheel sides, whereby it is possible to travel while the torque distribution for the front and rear wheels is controlled via the two electric motors and the propeller shaft 10.

Driving Control Method of Electric-Motor Four-Wheel Drive Vehicle 100

Next, with reference to FIG. 7, a method for controlling driving of the electric-motor four-wheel drive vehicle 100, which is performed by the controller ECU according to this embodiment, will be described. The following describes a case of appropriately selecting one from among the first to the fourth states, as an example of the torque distribution control performed by the controller ECU. However, the first to the fourth states are merely examples, and other states may also be provided.

After a driver gets in the electric-motor four-wheel drive vehicle 100 and starts the electric motor, first, whether an automatic mode is set is determined by the controller ECU in Step 1. The processing advances to Step 2-1 in the case in which the automatic mode is set in Step 1 or advances to Step 2-2 in the case in which the automatic mode is not set.

In Step 2-1 in the state in which the automatic mode is set, various information are acquired from various sensors and onboard devices, such as an onboard camera and a navigation system under control of the controller ECU. The information includes information relating to speed, acceleration, and angular velocity from a speed/acceleration sensor and a gyroscope sensor that are mounted on the electric-motor four-wheel drive vehicle 100. The information also includes information relating to driver's operation, such as an opening degree of an accelerator pedal and a steering angle of a steering wheel. Examples of pieces of information acquired in Step 2-1 include speed, acceleration, angular acceleration, vehicle speed pulse, image information location information, and map information.

Next, in Step 3-1, the suitable state is determined on the basis of the acquired various information, under control of the controller ECU. For example, in one example, in the case in which the electric-motor four-wheel drive vehicle 100 is determined as being in a start state, on the basis of the acquired vehicle speed information, the controller ECU controls each of the electric motors and each of the decoupling mechanisms so as to establish the first state. In another example, in the case in which the electric-motor four-wheel drive vehicle 100 is determined as being climbing a hill, on the basis of the acceleration information, the map information, or other information, each of the electric motors and each of the decoupling mechanisms are controlled so as to establish the third state.

Thus, in this embodiment, the traveling situation of the electric-motor four-wheel drive vehicle 100 is determined on the basis of the information from the various sensors and the onboard devices, and each of the electric motors and each of the decoupling mechanisms are controlled to perform appropriate torque distribution on the basis of result of this determination. This enables obtaining both excellent road running performance and high steering stability with respect to various road surface situations without making a driver perform any complicated operation. The travel situation of the electric-motor four-wheel drive vehicle 100 is determined on the basis of the information from the various sensors and the onboard devices, whereby appropriate torque distribution can be executed. Thus, the driving forces are efficiently transmitted to the drive wheels by using the two electric motors.

In the subsequent Step 4-1, whether the mode is changed by a driver or a passenger is determined. For example, whether the automatic mode is switched to a manual mode is determined under control of the controller ECU. In the case in which the automatic mode is switched to the manual mode, the processing advances to Step 2-2. Otherwise, in the case in which the mode is not changed, whether the electric motors are turned off is determined in the subsequent Step 5-1. In the case in which the electric motors are not turned off in Step 5-1, the control is executed to make the processing return to Step 2-1 and to continue the subsequent processes.

Next, an example of starting in the manual mode will be described.

That is, in the case in which it is determined as being in the manual mode in Step 1, the control is started in the current state in Step 2-2. Normally, the time when the electric motor is turned on and is started corresponds to the start time. Thus, when the processing advances from Step 1 to Step 2-2, each of the electric motors and each of the decoupling mechanisms are controlled to establish the first state. On the other hand, when the processing advances from Step 4-1 to Step 2-2, the control is continued while the current state is maintained.

In the subsequent Step 3-2, whether the mode is changed is determined. The control is executed to make the processing advance to Step 2-1 in the case in which the mode is changed or advance to Step 4-2 in the case in which the mode is not changed.

In the subsequent Step 4-2 in the state in which the mode is not changed, whether the state is changed by a driver or a passenger is determined. In the case in which the state is changed, each of the electric motors and each of the decoupling mechanisms are controlled to establish the newly selected state, in Step 5-2. On the other hand, in the case in which the state is not changed in Step 4-2, the processing returns to Step 2-2, and the control for the subsequent steps is continued.

After the control is started in the state that is newly selected in Step 5-2, whether the electric motors are stopped or turned off is determined in Step 6. In the case in which the electric motors are not turned off in Step 6, the control is executed to make the processing return to Step 2-2 and to continue the subsequent processes.

As described above, the driving device of the electric-motor four-wheel drive vehicle 100 in this embodiment includes the four wheels that are mechanically directly coupled to each other by the two electric motors and the propeller shaft. In addition, the torque and the driving forces are distributed to the drive wheels by the two decoupling mechanisms. Thus, rotations of the electric motors are efficiently transmitted to the drive wheels.

The driving control method of the electric-motor four-wheel drive vehicle 100 in this embodiment involves setting a possible suitable state on the basis of various information from the onboard sensors and the onboard devices in the case in which the automatic mode is selected. This enables efficient transmission of the driving forces to the drive wheels while maintaining excellent road running performance and high steering stability with respect to various road surface situations.

The foregoing embodiment is merely a suitable example of the disclosure, and each component of the embodiment can be appropriately combined to implement a new structure or new control, without departing from the gist of the disclosure.

For example, although a case of not interposing a decelerator or a speed change gear between the first motor MG1 and the propeller shaft 10 is described in the foregoing embodiment, the structure is not limited to this. The first motor MG1 may have the same structure as the second motor MG2, and moreover, a decelerator or a speed change gear may be disposed on the first motor MG1 side.

Although an example of performing regenerative charging by using the first motor MG1 is described in view of efficiency of the regenerative charging, the operation is not limited to this. The regenerative charging may be performed by using the second motor MG2 or may be performed by using both of these motors.

The twin motor structure having the first motor MG1 and the second motor MG2 is used in the foregoing embodiment, but the configuration is not limited to this. For example, a total of three or more electric motors may be mounted.

As described above, the driving device and the control method thereof of the electric-motor four-wheel drive vehicle of the embodiment of the disclosure are suitable to achieve a four-wheel drive vehicle having excellent road running performance and high steering stability that are maintained by efficient torque distribution.

The invention claimed is:

1. A driving device of an electric-motor four-wheel drive vehicle, the driving device comprising:
   a propeller shaft configured to transmit power between front wheels and rear wheels;
   a first differential mechanism to be disposed in a drive shaft of the front wheels;
   a second differential mechanism to be disposed in a drive shaft of the rear wheels;
   a first decoupling mechanism configured to decouple the first different mechanism from the propeller shaft;
   a second decoupling mechanism configured to decouple the second differential mechanism from the propeller shaft;
   a first motor coupled to the propeller shaft via one of (i) a part closer to the front wheels than the first decoupling mechanism and (ii) a part closer to the rear wheels than the second decoupling mechanism; and
   a second motor coupled between the first decoupling mechanism and the second decoupling mechanism.

2. The driving device of the electric-motor four-wheel drive vehicle according to claim 1, wherein the first motor comprises an output shaft to be disposed in parallel to the drive shaft of the front wheels.

3. The driving device of the electric-motor four-wheel drive vehicle according to claim 1, wherein the second motor comprises an output shaft that is disposed in parallel to the propeller shaft.

4. The driving device of the electric-motor four-wheel drive vehicle according to claim 2, wherein the second motor comprises an output shaft that is disposed in parallel to the propeller shaft.

5. The driving device of the electric-motor four-wheel drive vehicle according to claim 1, wherein
   a maximum output of the second motor is greater than a maximum output of the first motor, and
   the second motor is coupled to the propeller shaft via a speed change gear or a decelerator.

6. The driving device of the electric-motor four-wheel drive vehicle according to claim 2, wherein
   a maximum output of the second motor is greater than a maximum output of the first motor, and
   the second motor is coupled to the propeller shaft via a speed change gear or a decelerator.

7. The driving device of the electric-motor four-wheel drive vehicle according to claim 1, further comprising:
   a controller configured to control decoupling of each of the first decoupling mechanism and the second decoupling mechanism, wherein
   the controller is configured to control the decoupling of each of the first decoupling mechanism and the second decoupling mechanism in accordance with states of outputs of the first motor and the second motor.

8. The driving device of the electric-motor four-wheel drive vehicle according to claim 1, further comprising:
   a controller configured to control decoupling of each of the first decoupling mechanism and the second decoupling mechanism, wherein
   the controller is configured to control the decoupling of each of the first decoupling mechanism and the second decoupling mechanism in accordance with states of outputs of the first motor and the second motor.

9. The driving device of the electric-motor four-wheel drive vehicle according to claim 7, wherein
   the controller is configured to control the first decoupling mechanism and the second decoupling mechanism in such a manner as to maintain coupling between the first differential mechanism and the propeller shaft and to maintain coupling between the second differential mechanism and the propeller shaft, while no output is provided from the first motor, and the output from the second motor is transmitted to the drive shaft of the front wheels and the drive shaft of the rear wheels via the propeller shaft.

10. The driving device of the electric-motor four-wheel drive vehicle according to claim 7, wherein
    the controller is configured to control the first decoupling mechanism and the second decoupling mechanism in such a manner as to maintain coupling between the first differential mechanism and the propeller shaft and to maintain coupling between the second differential mechanism and the propeller shaft, while no output is provided from the first motor, and the output from the second motor is transmitted to the drive shaft of the front wheels and the drive shaft of the rear wheels via the propeller shaft.

11. The driving device of the electric-motor four-wheel drive vehicle according to claim 7, wherein
    the controller is configured to control the first decoupling mechanism and the second decoupling mechanism in such a manner as to decouple the first differential mechanism from the propeller shaft and to decouple the second differential mechanism from the propeller shaft, while no output is provided from the second motor, and the output from the first motor is transmitted to the drive shaft of the front wheels.

12. The driving device of the electric-motor four-wheel drive vehicle according to claim 9, wherein
    the controller is configured to control the first decoupling mechanism and the second decoupling mechanism in such a manner as to decouple the first differential mechanism from the propeller shaft and to decouple the second differential mechanism from the propeller shaft, while no output is provided from the second motor, and the output from the first motor is transmitted to the driveshaft of the front wheels.

13. The driving device of the electric-motor four-wheel drive vehicle according to claim 7, wherein
    the controller is configured to control the first decoupling mechanism and the second decoupling mechanism in such a manner as to maintain the coupling between the first differential mechanism and the propeller shaft and to maintain the coupling between the second differential mechanism and the propeller shaft, while the output from the first motor and the output from the second motor are transmitted to the drive shaft of the front wheels and the drive shaft of the rear wheels via the propeller shaft.

14. The driving device of the electric-motor four-wheel drive vehicle according to claim 9, wherein
    the controller is configured to control the first decoupling mechanism and the second decoupling mechanism in such a manner as to maintain the coupling between the first differential mechanism and the propeller shaft and to maintain the coupling between the second differential mechanism and the propeller shaft, while the output from the first motor and the output from the second motor are transmitted to the drive shaft of the front wheels and the drive shaft of the rear wheels via the propeller shaft.

15. The driving device of the electric-motor four-wheel drive vehicle according to claim 11, wherein
the controller is configured to control the first decoupling mechanism and the second decoupling mechanism in such a manner as to maintain the coupling between the first differential mechanism and the propeller shaft and to maintain the coupling between the second differential mechanism and the propeller shaft, while the output from the first motor and the output from the second motor are transmitted to the drive shaft of the front wheels and the drive shaft of the rear wheels via the propeller shaft.

16. The driving device of the electric-motor four-wheel drive vehicle according to claim 7, wherein
the controller is configured to control the first decoupling mechanism and the second decoupling mechanism in such a manner as to decouple the first differential mechanism from the propeller shaft and to maintain the coupling between the second differential mechanism and the propeller shaft, while the output from the first motor is transmitted to the drive shaft of the front wheels and the output from the second motor is transmitted to the drive shaft of the rear wheels.

17. The driving device of the electric-motor four-wheel drive vehicle according to claim 9, wherein
the controller is configured to control the first decoupling mechanism and the second decoupling mechanism in such a manner as to decouple the first differential mechanism from the propeller shaft and to maintain the coupling between the second differential mechanism and the propeller shaft, while the output from the first motor is transmitted to the drive shaft of the front wheels and the output from the second motor is transmitted to the drive shaft of the rear wheels.

18. The driving device of the electric-motor four-wheel drive vehicle according to claim 11, wherein
the controller is configured to control the first decoupling mechanism and the second decoupling mechanism in such a manner as to decouple the first differential mechanism from the propeller shaft and to maintain the coupling between the second differential mechanism and the propeller shaft, while the output from the first motor is transmitted to the drive shaft of the front wheels and the output from the second motor is transmitted to the drive shaft of the rear wheels.

19. The driving device of the electric-motor four-wheel drive vehicle according to claim 13, wherein
the controller is configured to control the first decoupling mechanism and the second decoupling mechanism in such a manner as to decouple the first differential mechanism from the propeller shaft and to maintain the coupling between the second differential mechanism and the propeller shaft, while the output from the first motor is transmitted to the drive shaft of the front wheels and the output from the second motor is transmitted to the drive shaft of the rear wheels.

* * * * *